United States Patent [19]

Kuiper et al.

[11] Patent Number: 4,921,716

[45] Date of Patent: May 1, 1990

[54] AROMA COMPOSITION CONTAINING ALPHA-ACETOLACTIC ACID

[75] Inventors: Jan Kuiper, Vlaardingen; Walter M. Verhue, Oostvoorne; Pieter M. Klapwijk, Capelle a/d Ijssel, all of Netherlands

[73] Assignee: Unilever Patent Holdings B.V., Rotterdam, Netherlands

[21] Appl. No.: 316,523

[22] Filed: Feb. 27, 1989

Related U.S. Application Data

[63] Continuation of Ser. No. 39,069, Apr. 16, 1987, abandoned.

[30] Foreign Application Priority Data

Apr. 25, 1986 [NL] Netherlands .......................... 8601078

[51] Int. Cl.$^5$ ............................................... A23L 1/226
[52] U.S. Cl. ....................................... 426/534; 426/43; 426/588
[58] Field of Search ...................... 426/42, 43, 34, 580, 426/582, 581, 586, 601, 602, 603, 534, 588

[56] References Cited

U.S. PATENT DOCUMENTS

| | | | |
|---|---|---|---|
| 3,535,121 | 10/1970 | Luksas | 426/41 |
| 3,962,464 | 6/1976 | Sozzi | 426/603 |
| 4,292,333 | 9/1981 | Bosco et al. | 426/603 |
| 4,310,554 | 1/1982 | Olson | 426/40 |
| 4,414,229 | 11/1983 | Bakal et al. | 426/603 |
| 4,454,160 | 6/1984 | Jonsson | 426/534 |
| 4,533,561 | 8/1985 | Ward | 426/603 |
| 4,606,926 | 8/1986 | Wiles et al. | 426/603 |
| 4,656,045 | 4/1987 | Bodor et al. | 426/603 |
| 4,670,267 | 6/1987 | Chang | 426/603 |
| 4,684,532 | 8/1987 | Izzo | 426/603 |

FOREIGN PATENT DOCUMENTS 93517  3/1960 Netherlands .

OTHER PUBLICATIONS

Watt, 1975 Composition of Foods, pp. 18–19, U.S.D.A. Handbook No. 8, Washington DC.

*Primary Examiner*—Carolyn Paden
*Attorney, Agent, or Firm*—Cushman, Darby & Cushman

[57] ABSTRACT

The present invention relates to an aroma composition with a low water content comprising alpha-acetolactic acid at a relatively high concentration level, and of which the rest consists mainly of edible carrier material.

4 Claims, No Drawings

AROMA COMPOSITION CONTAINING ALPHA-ACETOLACTIC ACID

This is a continuation of application Ser. No. 039,069, filed Apr. 16, 1987, which was abandoned upon the filing hereof.

BACKGROUND OF THE INVENTION

The invention relates to an aroma composition in which alpha-acetolactic acid (2-hydroxy-2-methyl-3-oxobutanoic acid) and diacetyl (2,3-butanedion) are present and to the preparation and use of such a composition.

It has already been known for some decades to use diacetyl as an additive for, for example, butter substitutes in order to give them a butter-like aroma, with which by "aroma" both the odour and taste impression are meant.

Dutch patent specification 93 517 (Stichting Bedrijven van het Nederlands Instituut voor Zuivelonderzoek) describes a process for aromatizing butter and margarine by incorporating alpha-acetolactic acid in said products, or in the aqueous phase of one or more of the starting materials therefor, before the preparation of these products. In this case an (aqueous) solution of alpha-acetolactic acid in a concentration of 10 g/l is used as aroma composition. The use of a liquid, particularly aqueous, aroma composition containing alpha-acetolactic acid has the drawback that alpha-acetolactic acid is rather unstable. Moreover, liquid aroma compositions make greater demands on the packaging material, and liquid aroma compositions are not suitable for incorporation in dry, powdery products such as flour, cake mixes, etc. in connection with, for example, the formation of lumps.

It should be observed that the process according to the above-mentioned patent specification is directed to the aromatizing of butter and margarine by converting the added alpha-acetolactic acid into diacetyl as much as possible during the preparation thereof. Moreover, by the time such products are sold to consumers, most of the alpha-acetolactate will have been converted into diacetyl owing to the low stability in water of the former compound.

Because diacetyl is a very volatile compound, during storage of such a product diacetyl will gradually escape from the product and consequently the active concentration of diacetyl present in the product will decrease. The high volatile of diacetyl is also the cause of all the diacetyl present already being released at the beginning of the frying process, when frying with a butter or margarine prepared according to the process of the above-mentioned patent specification.

If, moreover, as a result of the limited stability of alpha-acetolactic acid, when incorporated in a liquid, only very little alpha-acetolactic acid is present, only very little alpha-acetolactic acid will be able to be converted into diacetyl, so that the fried product does not obtain a fully butter-like aroma.

BRIEF SUMMARY OF THE INVENTION

It has now been found that an aroma composition with improved properties is obtained if alpha-acetolactic acid is incorporated in a composition consisting for the greater part of carrier material having a low content of water. Alpha-acetolactic acid is a diacetyl precursor which, because of oxidative decarboxylation, turns into diacetyl, as a result of which a product can be obtained which, even after a relatively long frying time, still has a butter-like aroma. Accordingly, the present invention relates to an aroma composition with a low water content wherein the sum of the contents of alpha-acetolactic acid and diacetyl is at least 0.005% by weight, and of which the rest mainly consists of edible carrier material. Preferably, the sum of the contents of alpha-acetolactic acid and diacetyl lies between 0.01 and 5%, more preferably between 0.05 and 2% by weight.

In a preferred embodiment, the alpha-acetolactic acid content is at least 0.01% by weight, preferably 0.05% by weight.

In another preferred embodiment, the weight ratio between alpha-acetolactic acid and diacetyl is greater than 2, preferably it is less than 10,000 and more than 10.

In an aroma composition according to the present invention the alpha-acetolactic acid is preferably present in a matrix of carrier material, as a result of which such an aroma composition containing alpha-acetolactic acid has a considerably improved stability compared with, for example, an aroma composition in which alpha-acetolactic acid is present in aqueous environment.

As the stability of the alpha-acetolactic acid present in the aroma composition is negatively influenced by the presence of water, preferably there is no more than 10% water, more preferably less that 5% by weight of water present in the composition. As there will always be some water left in the carrier material, the water content will normally exceed 0.1% and 0.3% by weight of the composition.

By incorporating alpha-acetolactic acid in a composition which consists for the greater part of carrier material poor in water, a product is obtained having a good stability and it is possible to dose the composition accurately. In principle, any dry edible material can function as carrier material, but preferably use is made of a dried milk product or vegetable material.

U.S. patent specification 3,535,121 (Beatrice Foods) describes the fermentation of skim milk for the preparation of a cream cheese flavour by inoculating it with a bacterial culture containing *Streptococcus diacetilactis* and allowing the fermentation to proceed for three days under forced aerobic conditions at a temperature of 32° C., so that possibly present alpha-acetolactic acid is converted into diacetyl, whereafter the fermentation produce is pasteurized prior to being spray-dried. The product obtained by means of this process will only contain a small amount of the diacetyl precursor alpha-acetolactic acid, so that during frying hardly any diacetyl or none at all can be formed.

U.S. patent specification 4,454,160 (Svenska Mejeriernas Riksforenings Ekonomi AB) describes the preparation of a butter aroma distillate by inoculating a whey substrate having a dry solids content of 12% by weight with a bacterial mixture in which *S. diacetilactis, S. lactis* and *Leuconostoc cremoris* are present, which fermentation mixture produces a substantial amount of alpha-acetolactic acid, acidification of the medium to pH 3.5 and steam-distillation of the acidified medium under injection of oxygen in order thus to convert the formed alpha-acetolactic acid into diacetyl. This patent specification thus teaches the use of a selected culture containing *S. diacetilactis* (a so-called BD-culture) for obtaining a high yield of alpha-acetolactic acid, but the patent specification subsequently prescribes measures for converting as much of the alpha-acetolactic acid as possible into diacetyl. The alpha-acetolactic acid thus only functions as an intermediate product which, subsequently, in the fermentation medium, is converted into diacetyl.

DETAILED DESCRIPTION OF THE INVENTION

The process according to the present invention is directed to the preparation of a composition containing alpha-acetolactic acid by fermenting a pasteurized or sterilized milk product with the aid of a selected culture containing S. diacetilactis which has a high yield of alpha-acetolactic acid, taking measures to decrease the conversion of alpha-acetolactic acid into diacetyl and drying the fermentation product. Preferably, such measures are taken that the weight ratio between alpha-acetolactic acid and diacetyl in the dried fermentation product is at least 2. By "milk product" is meant a liquid composition containing milk components, such as whey, skim milk, whole milk, reconstituted milk, buttermilk etc. In order to obtain a product having as high a content of alpha-acetolactic acid as possible, the following measures, optionally in combination, can be taken:

(i) making sure that the pH during the fermentation does not become lower than 3, preferably that it remains between 4 and 8 and more preferably between 5 and 7.

(ii) if the pH after the fermentation is lower than 5, increasing the pH to a value above 5 before drying is carried out.

(iii) making use of a milk product as fermentation medium, which milk product has an increased dry solids content of 8-60% preferably 30-60% by weight.

(iv) adding extra citric acid (2-hydroxy-1,2,3-propanetricarbonic acid) and/or oxaloacetic acid (2-oxobutanoic diacid) and/or pyruvic acid (2-oxopropanoic acid), or the salts hereof, to the fermentation medium.

An advantage of using milk products with an increased dry solids content is that, upon drying such a product, flavour losses can be minimized. Moreover, such a high solids content appears to reduce the culture's susceptibility to bacteriophages. Instead of using a milk product with a high solids content, it is also possible to ferment a whey product having a rather low dry solids content and add dry milk powder thereto before the drying operation. By adding extra milk powder, also extra citrate is added to the composition so that it is possible to continue fermentation in order to obtain a relatively high alpha-acetolactic acid yield.

The addition of extra citric acid and/or oxaloacetic acid and/or pyruvic acid preferably occurs towards the end of the fermentation, whereafter the fermentation is continued, as a result of which a still higher yield of alpha-acetolactic acid is obtained than when the same amount and composition would have been added before the fermentation. The fermentation is normally carried out at room temperature, but it is also possible to carry out the fermentation process at temperatures within the range of 15°-35° C.

If a well balanced aroma is desired, other bacteria which produce aroma compounds can be used besides S. diacetilactis, such as L. cremoris, S. lactis etc. Thus, for example, by combining S. diacetilactis with L. cremoris it can be brought about that any acetaldehyde possibly formed is converted into other compounds so that the butter aroma does not deviate too much in the direction of a yoghurt aroma. A well balanced aroma may also be obtained by adding additional aroma compounds to the fermented composition prior to drying.

The drying of the fermentation product should take place in a manner in which as little alpha-acetolactic acid as possible is lost. It has appeared that good results can be obtained with spray-drying and freeze-drying. If the fermentation product is spray-dried, preferably use is made of a spray-drying installation provided with a fluidized bed because such an installation guarantees particularly mild drying conditions.

Prior to the drying, the fermentation product can be pasteurized or sterilized in order to prevent the obtained aroma compounds from being converted further by the bacteria present. Pasteurization of the fermentation product preferably takes place if the drying demands much time, for example if the fermentation product is concentrated before freeze- or spray-drying.

It is surprising that, although alpha-acetolactic acid is converted into diacetyl under, for example, baking and frying conditions, it is relatively stable under pasteurizing and freeze- or spray-drying conditions.

Another aspect of the present invention is a process for the preparation of a butter substitute, which process is characterized in that, before the aqueous phase and the oil phase are mixed with each other, an aroma composition according to the present invention is added to the aqueous phase. In this manner it is still possible, for example, in a margarine-manufacturing factory which is not equipped with an (aseptic) fermentation installation for the fermentation of milk products, to make margarines or low-calorie butter substitutes, for example "halvarine", having a butter-like aroma. It has been found, namely, that during the mixing of the oil phase and the aqueous phase in scraped-surface heat exchangers, the so-called "Votators" (Trademark) or "A-units", part of the alpha-acetolactic acid present is converted into diacetyl. Another advantage of using the dry compositions according to the invention for flavouring spreads is that these dry compositions are easier to handle and to transport than fluid milk products such as skim milk, which latter compositions are, for example, more liable to deterioration.

In the Dutch patent NL-C N° 93 518 it has already been suggested to add an aqueous solution of alpha-acetolactic acid to margarine or butter. Such an aqueous solution, however, will not confer a balanced flavour to the water phase of the margarine. The aroma compositions obtained by drying the fermented milk products according to the present invention, however, do confer a very balanced flavour to the margarine as they comprise, besides diacetyl and alpha-acetolactic acid, a number of other flavour compounds and flavour precursor compounds. It is therefore possible to use the latter aroma composition to give margarine or other spreads a butter-like flavour, whereas this is impossible by solely applying the alpha-acetolactic acid concentrates described in the above-mentioned Dutch patent. The present invention therefore also provides a spread obtainable by the process described above. Such a spread preferably contains such an amount of the aroma composition obtained by drying the fermented milk product, that alpha-acetolactic acid is present therein at a concentration level of from 1-50 ppm. Moreover, the weight ratio of alpha-acetolactate to diacetyl in such a spread is preferably at least 2, more preferably less than 10,000 and more than 10.

Another aspect of the present invention is a frying fat or oil containing an aroma composition as described above. Preferably, the aroma composition is incorporated at such a concentration level that alpha-acetolactic acid is present at a concentration of 1–50 ppm.

The words "fat" and "oil" are used interchangeably throughout this application. By fat and oil is meant a triglyceride composition, but also non-toxic material having physical properties similar to those of triglycerides, which material may be indigestible, such as for example jojoba oil, or esters of fatty acids and sugars.

Yet another aspect of the invention relates to baking materials such as cake mixes, flour, bakery fats, among which low-calorie products are also ranked, etc. in which the aroma composition according to the invention is incorporated. Preferably, the aroma composition is incorporated at such a concentration level that alpha-acetolactic acid is present at a concentration of 1–100 ppm.

The invention is illustrated by the following examples:

EXAMPLE I

All the *S. diacetilactis* D-cultures referred to in this example and the following examples can be obtained from the firm "Christian Hansen" and are sold under the name Flora Danica IBA.

Milk with a dry solids content of 9% by weight was inoculated with an *S. diacetilactis* culture. After practically all the citric acid present had been converted at room temperature, a pH of 4.8 was reached and an alpha-acetolactic acid concentration of 138 mg/kg was measured. Subsequently the pH was brought to 7.0 with caustic soda, whereafter the fermentation product was pasteurized by heating for 1 minute to 90° C. The pasteurized product had an alpha-acetolactic acid content of 134 mg/kg. Prior to the freeze-drying, the pasteurized product was concentrated at 45° C. In order to determine the loss of alpha-acetolactic acid during this step, a sample of the concentrated product was diluted again to a dry solids content of 9% by weight, whereafter an alpha-acetolactic acid concentration of 61 mg/kg was measured.

The great loss of alpha-acetolactic acid can presumably be explained by the small concentration installation in which the fermentation product caked on the walls. The concentrated product was subsequently freeze-dried, whereafter a sample of the freeze-dried product, after having been diluted again to 9% by weight dry solids, appeared to contain alpha-acetolactic acid in a concentration of 59 mg/kg. It appeared thus that during the freeze-drying only very slight losses of alpha-acetolactic acid occurred.

EXAMPLE II

Milk with a dry solids content of 9% by weight was fermented at 20° C. with the aid of an *S. diacetilactis* culture until a pH of 4.75 had been reached, whereafter the alpha-acetolactic acid concentration in the fermentation product was 135 mg/kg. Thereafter 0.4% by weight of the sodium salt of citric acid was added, whereafter the pH was increased to 7 with the aid of caustic soda and the fermentation was continued for a further hour and a half. The product thus obtained contained alpha-acetolactic acid in a concentration of 252 mg/1, from which it appears that the addition of citric acid after the main fermentation can provide a strong increase in the yield of alpha-acetolactic acid.

After the pasteurization of the neutralized product by heating it for 1 minute to 90° C., 196 mg/kg alpha-acetolactic acid appeared still to be present. After concentration of the pasteurized product at 45° C. to a dry solids content of 40% by weight, the content of alpha-acetolactic acid was once more determined after dilution of a sample to 9% by weight dry solids. A concentration of 139 mg/kg was found. The loss of alpha-acetolactic acid can, just as in the first example, presumably be ascribed to the concentration installation.

After freeze-drying of the pasteurized, but not concentrated product, it appeared, after dilution of a sample to a solution of 9% by weight, that 183 mg/kg alpha-acetolactic acid was present, with which it is shown that this drying technique barely results in losses of alpha-acetolactic acid. The weight ratio of alpha-acetolactic acid to diacetyl appeared to be about 12. Comparable results can be obtained if spray-drying is chosen instead of freeze-drying.

In both examples the alpha-acetolactic acid content in the compositions was measured by first of all measuring the diacetyl concentration after the composition was neutralized to a pH of 7, then practically quantitatively converting the alpha-acetolactic acid present into diacetyl by means of aeration and acidification to pH 2.5, and thereafter once more measuring the diacetyl content. By subtracting the first-measured diacetyl content from the last-measured diacetyl content the content of alpha-acetolactic acid is obtained. In doing this, the difference in molecular weight between diacetyl and alpha-acetolactic acid must of course be taken into account. The measuring of the diacetyl content took place with the aid of headspace gas chromatography after a fraction of the milk product had been equilibrated at 70° C. for at least 10 minutes.

In the following examples III to IX the same method for determining the alpha-acetolactate content is used. The milk products are diluted to a solids content of 10% (w/w) before the measurements are made.

EXAMPLE III 3 kg of reconstituted skim milk with 20% dry milk solids was pasteurized for 1 minute at 90° C. in a heated coil. Then a concentrated sterilized Na-citrate solution was added so that the final concentration was 0.4% Na-citrate.

The milk solution was adjusted to a temperature of 20° C. and inoculated with a 1% *Streptococcus diacetilactis* culture.

After a fermentation time of 17 hours at 20° C., the pH was 5.2 and the alpha-acetolactate content was 576 mg/kg 20% milk. The citrate content was 16% of its initial value.

Subsequently, 40% Na-citrate was added to a concentration of 0.4% and 6N NaOH was added dropwise until the pH was 7.0. Then the milk was pasteurized at 90° C. for 30 seconds in a heated coil. After pasteurization, the alpha-acetolactate content was 388 mg/kg 20% milk. The pasteurized milk was freeze-dried and the powder had an alpha-acetolactate content of 1280 mg/kg.

EXAMPLE IV 6 kg skim milk powder solution with 30% dry matter (w/w) was pasteurized for 1 minute at 90° C. by means of a heated coil. To this solution a concentrated sterilized Na-citrate solution of 40% (w/w) was added to a final concentration of 0.4%.

The concentrated milk solution was adjusted to a temperature of 20° C. and inoculated with 5% of a

*Streptococcus diacetilactis* culture. The fermentation was carried out batchwise with no stirring. After a fermentation time of 20 hours, the pH was 5.5 and the concentration of alpha-acetolactic acid was 480 mg/kg 30% milk. A second portion of concentrated Na-citrate was then added to a final concentration of 0.4% Na-citrate and subsequently the solution was neutralized with 6N NaOH to a pH of 6.7. Subsequently, the milk was pasteurized for 30 seconds at 90° C. Then the milk was freeze-dried. The freeze-dried powder had an alpha-acetolactate content of 1,000 mg/kg powder.

EXAMPLE V 6 kg skim milk powder solution with 30% dry matter was pasteurized and fermented as in Example IV. After a fermentation time of 20 hours, the pH was 5.4 and the alpha-acetolactate content was 474 mg/kg.

After addition of concentrated Na-citrate solution to a final concentration of 0.4%, the milk with a pH of 5.5 was freeze-dried.

The freeze-dried powder had an alpha-acetolactate content of 1006 mg/kg powder. This example shows that good results may be obtained even if the fermented composition is not neutralized and/or pasteurized.

EXAMPLE VI

A skim milk powder solution with 40% dry matter was pasteurized for 1 minute at 90° C. with a scraped-surface heat exchanger.

To this milk a concentrated sterilized Na-citrate solution of 40% was added to a final concentration of 0.4%.

The concentrated milk solution was adjusted to a temperature of 20° C. and was inoculated with 10% of a *Streptococcus diacetilactis* culture. The fermentation was carried out in a stirred fermenter under nitrogen.

After a fermentation time of 20 hours, the pH was 5.5 and the alpha-acetolactate content was 392 mg/kg 40% milk.

EXAMPLE VII

A reconstituted skim milk powder solution of 30 kg with 30% dry matter was pasteurized for 1 minute at 90° C. with a scraped-surface heat exchanger. To the pasteurized milk a concentrated Na-citrate solution was added to a final concentration of 0.4% Na-citrate. The milk solution was adjusted to a temperature of 22° C. by means of a water bath and was inoculated with 6.7% of a *Streptococcus diacetilactis* culture which produces high concentrations of alpha-acetolactic acid. The fermentation was carried out batchwise and aseptically.

After a fermentation time of 18 hours, the pH was 5.35 and the citrate concentration had decreased to 6% of the initial value. The alpha-acetolactic acid concentration was 549 mg/kg.

Subsequently, 40% Na-citrate was added to a concentration of 0.4% and 6N NaOH was added dropwise until the pH was 6.8. The neutralized solution was spray-dried at an inlet temperature of 138° C. and an outlet temperature of 78° C.

The powder had an alpha-acetolactic acid concentration of 500 mg/kg.

EXAMPLE VIII 1 kg of a skim milk powder solution with 50% dry milk solids was inoculated with a 10% *Streptococcus diacetilactis* culture. After 24 hours of fermentation at 23° C. the pH of the composition had gone down to 6.0. The alpha-acetolactate content appeared to be 575 mg/kg. The fermented composition was neutralized to a pH of 7.0 with an $Na_3PO_4$ solution, after which treatment it was freeze-dried. The freeze-dried powder contained 890 mg/kg alpha-acetolactate.

EXAMPLE IX

A skim milk powder solution with 40% dry milk solids was inoculated with a 10% *Streptococcus diacetilactis* culture. After 20 hours of fermentation at 22° C. the pH of the composition was 5.7, and an alpha-acetolactate content of 372 mg/kg was measured. To the composition a concentrated sodium citrate solution of 40% (w/w) was added in such an amount that the final concentration was 0.4%.

Fermentation was continued for another three hours, after which an alpha-acetolactate content of 592 mg/kg was measured. The composition was neutralized with NaOH to a pH of 7.0, after which the composition was pasteurized by heating it for 21 seconds at 100° C. via a scraped-surface heat exchanger. After pasteurization, an alpha-acetolactic acid content of 508 mg/kg was measured.

Subsequently, the pasteurized composition was freezedried. The dry powder obtained had an alpha-acetolactic acid content of 1000 mg/kg.

The dry powder obtained via the procedure described above was used to flavour a conventional margarine. The margarine thus obtained had a diacetyl potential of 30 ppm. By "diacetyl potential" is meant the total content of diacetyl plus alpha-acetolactic acid.

A second margarine, identical with the above margarine, was prepared using, however, diacetyl in combination with skim milk powder in such amounts that the skim milk powder content and the diacetyl potential of both margarines were identical.

The heat release of diacetyl from both products was measured by the following method:

30 grams of margarine is brought into a round-bottomed flask with two openings. The flask is heated for 3 minutes at 120° C. with an oil bath while a stream of air is passed over the emulsion (20 ml/min.). After these 3 minutes, one of the openings is closed and a glass tube containing 100 mg Tenax (Trademark) GC-material is attached to the other opening. While maintaining the air stream, the flask is heated for 10 more minutes in the oil bath.

After 10 minutes, the glass tube is disconnected and brought into a special apparatus: a TCT (Trademark) ex Chrompack. This TCT is mounted on a conventional gas chromatograph. The volatiles adsorbed by the Tenax (Trademark) material are desorbed by heating the glass tube for 10 minutes at 250° C. while passing a stream of helium through it (5 ml/min.). The volatiles are trapped in a piece of fused silica which is cooled at −120° C. with liquid nitrogen.

After 10 minutes, the piece of fused silica is rapidly heated up to a temperature of 200° C. (20° C./sec.) while helium is passed through the silica.

The helium flow is passed through a Superox (Trademark) FA column (gas flow 2 ml/min.; temperature program 40-200° C., 5° C./min.; internal diameter 0.32 mm; length 50 m; film thickness 0.3/μm). By using this method, the amount of diacetyl adsorbed by the Tenax (Trademark) can be measured.

By using the above method, the following results were obtained for the two margarines:

|  | Amount of diacetyl measured (ppm) | |
| --- | --- | --- |
|  | (1) | (2) |
| Margarine with 30 ppm free diacetyl | — | 30 |
| Margarine with 30 ppm diacetyl + alpha-acetolactate | 6 | 30 |

(1) the method described above.
(2) as (1), but the flask is closed and the Tenax (Trademark) tube is attached prior to heating, so that all volatiles are trapped.

The results indicate that alpha-acetolactate, when present in a margarine, serves as a diacetyl precursor which is converted into diacetyl upon heating. The conversion, however, is gradual, so that, upon heating, the release of flavour will last longer. It is to be noticed that the margarine comprising the alpha-acetolactate contained a rather high amount of diacetyl, which indicates that the precursor effect of alpha-acetolactate is considerable.

We claim:

1. Powdery aroma composition comprising not more than 10% by weight of water wherein the sum of the contents of alpha-acetolactic acid and diacetyl lies between 0.01 and 5% by weight, the weight ratio between alpha-acetolactic acid and diacetyl being greater than 2 and of which the rest of the composition consists mainly of edible carrier material.

2. Aroma composition according to claim 1, wherein the alpha-acetolactic acid content is at least 0.01% by weight and the sum of the contents of the alpha-acetolactic acid and the diacetyl is 5% by weight.

3. Aroma composition according to claim 1 wherein the weight ratio between alpha-acetolactic acid and diacetyl lies between 10 and 10,000.

4. Aroma composition according to claim 1 wherein the composition contains 0.1–10% by weight of water.

* * * * *